United States Patent
Sun et al.

(10) Patent No.: US 10,522,828 B2
(45) Date of Patent: Dec. 31, 2019

(54) POSITIVE ACTIVE MATERIAL FOR RECHARGEABLE SODIUM BATTERY, AND METHOD OF FABRICATING THE SAME

(71) Applicant: IUCF-HYU (INDUSTRY-UNIVERSITY COOPERATION FOUNDATION HANYANG UNIVERSITY), Seoul (KR)

(72) Inventors: Yangkook Sun, Seoul (KR); Hyungjoo Noh, Bucheon-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 96 days.

(21) Appl. No.: 15/606,800

(22) Filed: May 26, 2017

(65) Prior Publication Data

US 2017/0346093 A1    Nov. 30, 2017

(30) Foreign Application Priority Data

May 26, 2016   (KR) .................. 10-2016-0064684

(51) Int. Cl.
| | | |
|---|---|---|
| *H01M 4/00* | (2006.01) | |
| *H01M 4/505* | (2010.01) | |
| *H01M 4/525* | (2010.01) | |
| *C01G 53/00* | (2006.01) | |
| *H01M 10/054* | (2010.01) | |
| *H01M 4/02* | (2006.01) | |

(52) U.S. Cl.
CPC .......... *H01M 4/505* (2013.01); *C01G 53/006* (2013.01); *C01G 53/44* (2013.01); *H01M 4/525* (2013.01); *C01P 2002/72* (2013.01); *C01P 2004/84* (2013.01); *C01P 2006/40* (2013.01); *H01M 10/054* (2013.01); *H01M 2004/028* (2013.01)

(58) Field of Classification Search
CPC .............................. C01G 53/44; H01M 4/505; H01M 2004/028; H01M 10/054
See application file for complete search history.

(56) References Cited

U.S. PATENT DOCUMENTS

| | | | | |
|---|---|---|---|---|
| 2010/0323232 A1* | 12/2010 | Kuze | ................. | H01M 2/1653 429/144 |
| 2015/0111097 A1* | 4/2015 | Park | ................... | H01M 4/485 429/188 |
| 2015/0303470 A1* | 10/2015 | Honma | ............... | H01M 4/5825 429/221 |
| 2017/0187039 A1* | 6/2017 | Sun | ................... | H01M 4/0471 |

FOREIGN PATENT DOCUMENTS

| | | | |
|---|---|---|---|
| JP | 2009-209038 B | | 9/2009 |
| KR | 100752703 B1 | | 8/2007 |
| KR | 1020140092492 A | | 7/2014 |
| WO | 2015/122705 | * | 8/2015 |
| WO | 2016/188877 | * | 12/2016 |

OTHER PUBLICATIONS

Jang Yeon. Hwang et al., "Full Concentration Gradient Na[Ni$_{0.6}$Co$_{0.05}$Mn$_{0.35}$]O$_2$ cathode material for high energy density sodium ion battery", P1(Ba-1)-49, pp. 228.

Jang Yeon. Hwang et al., "Full Concentration Gradient Na[Ni$_{0.6}$Co$_{0.05}$Mn$_{0.35}$]O$_2$ cathode material for high energy density sodium ion battery", P1(BA-1)-49, pp. 228, published Apr. 2, 2015.

Jang-Yeong Hwang et al., "Radially aligned hierarchical columnar structure as a cathode material for high energy density sodium-ion batteries", Nature Communications; DOI: 10.10.38/ncomms7865; Published Apr. 17, 2015; pp. 1-9.

* cited by examiner

*Primary Examiner* — Steven J Bos

(74) *Attorney, Agent, or Firm* — Sughrue Mion, PLLC

(57) ABSTRACT

A method of fabricating a positive active material for a rechargeable sodium battery is provided. The method includes forming a metal hydroxide precursor including nickel, cobalt, and manganese, and fabricating a positive active material by mixing and firing the metal hydroxide precursor and a sodium source. A kind of the sodium source is changed depending on a content of nickel or manganese included in the metal hydroxide precursor.

8 Claims, 16 Drawing Sheets

(9 of 16 Drawing Sheet(s) Filed in Color)

[Fig. 1]
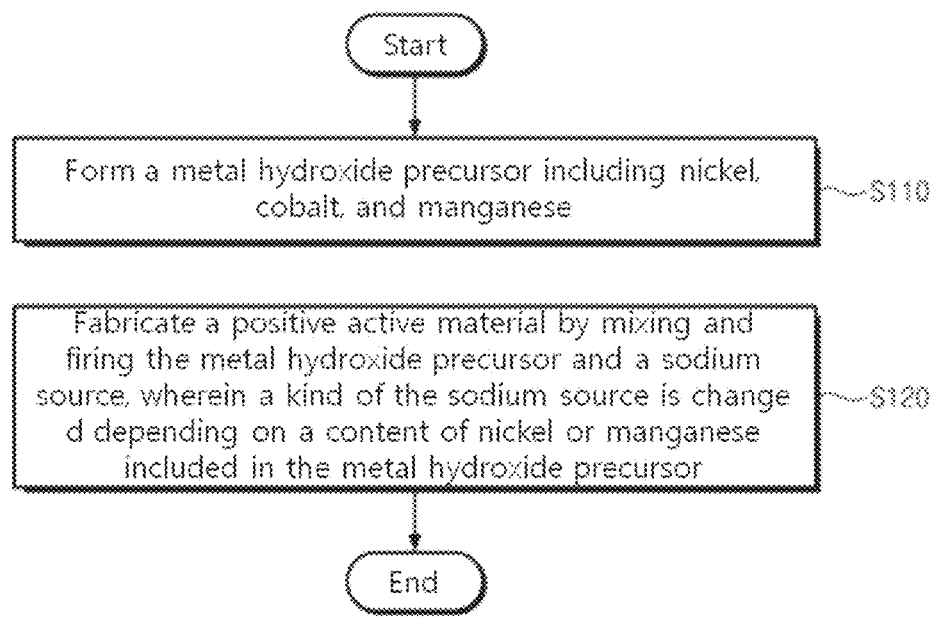

[Fig. 2]
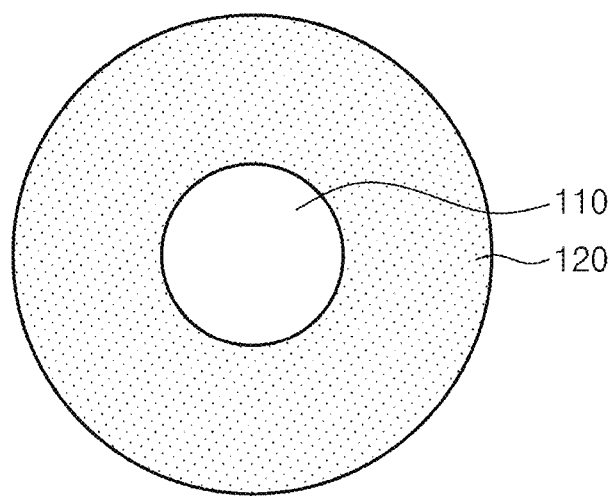

[Fig. 3]
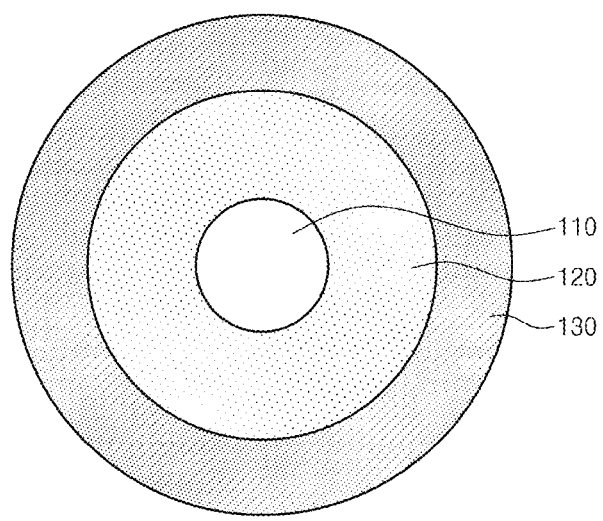

[Fig. 4]
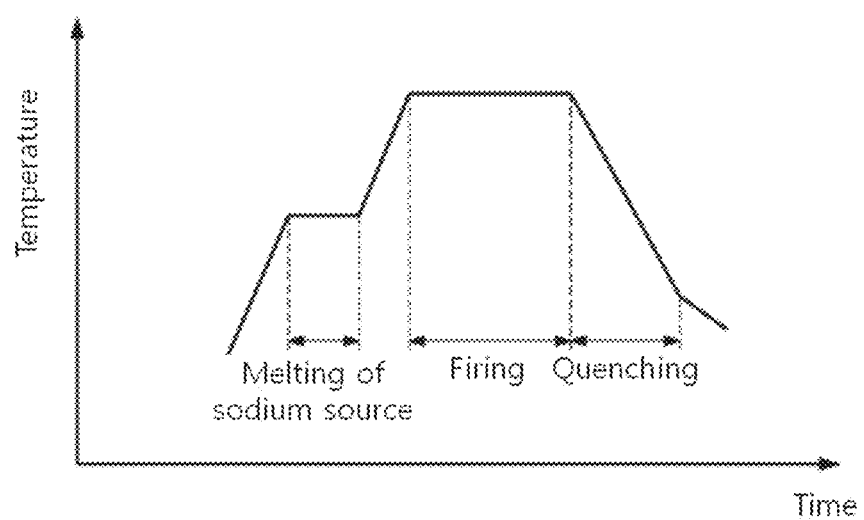

[Fig. 5]
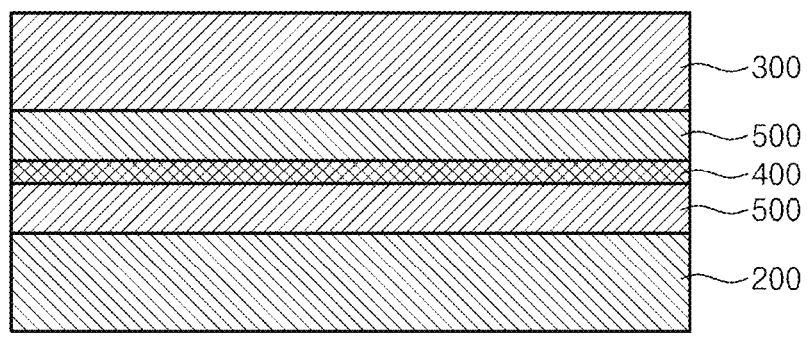

[Fig. 6]
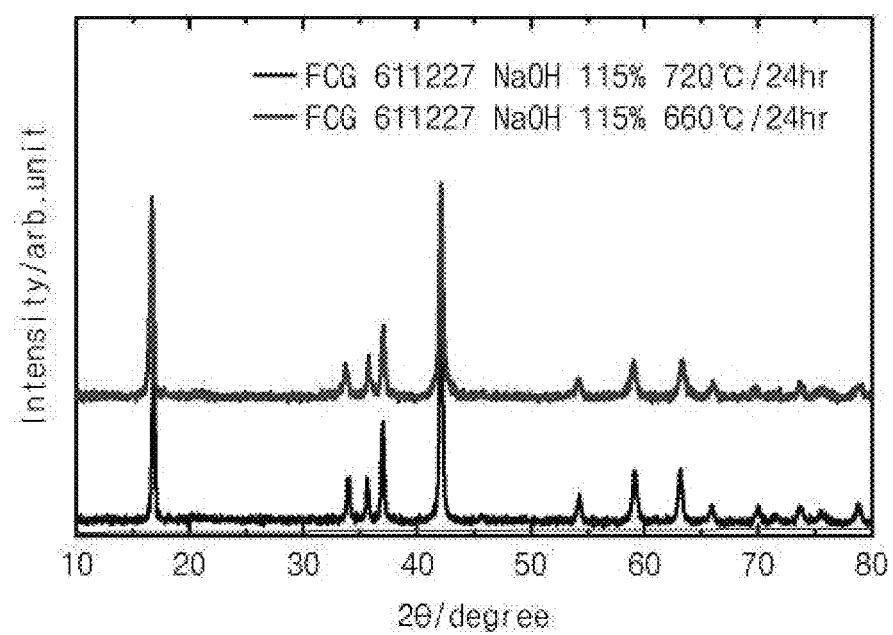

[Fig. 7]
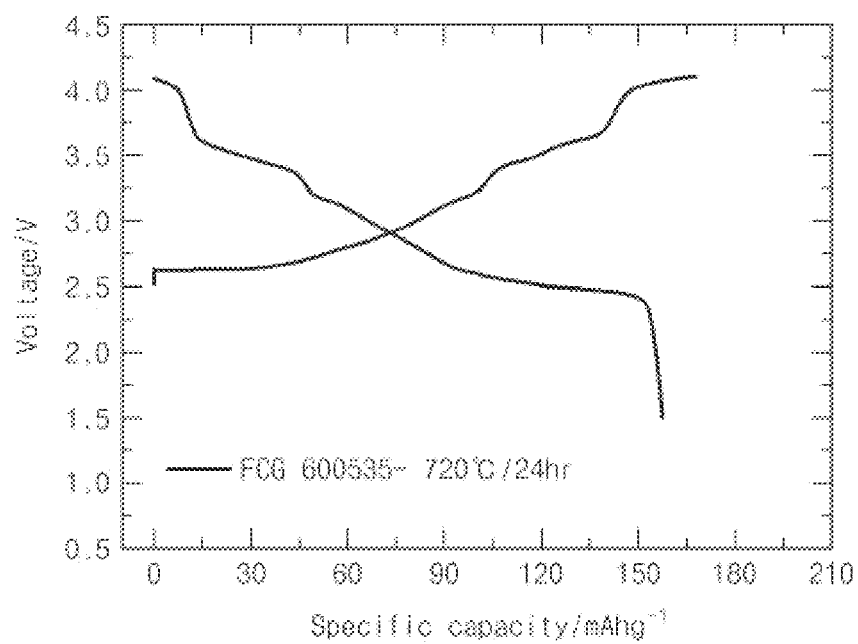

[Fig. 8]
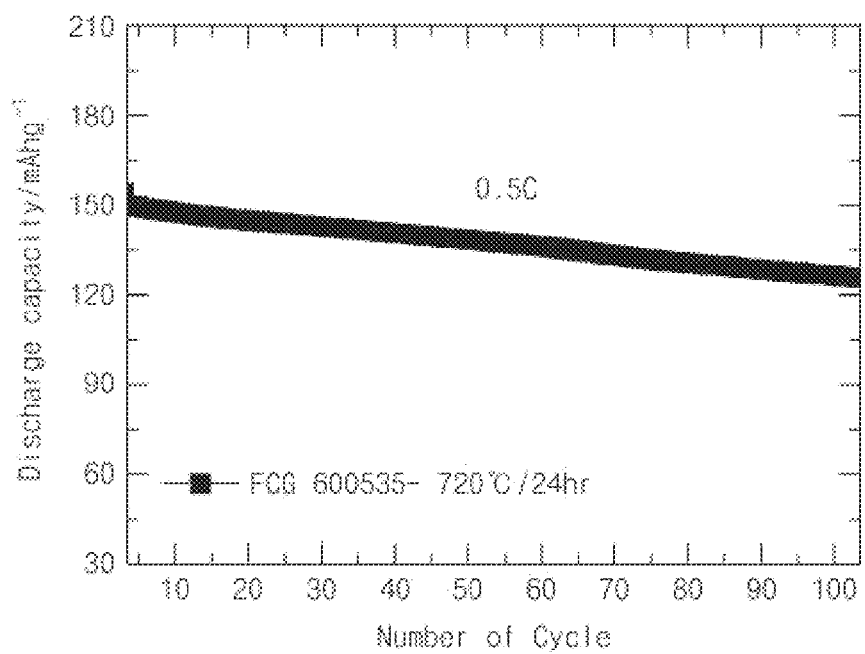

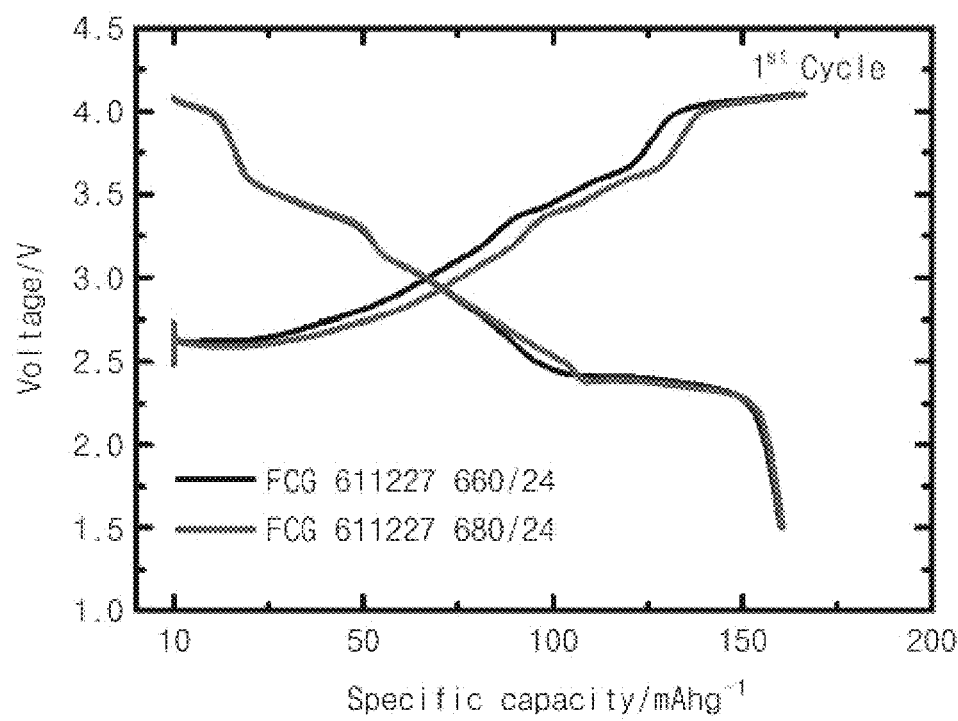
[Fig. 9]

[Fig. 10]
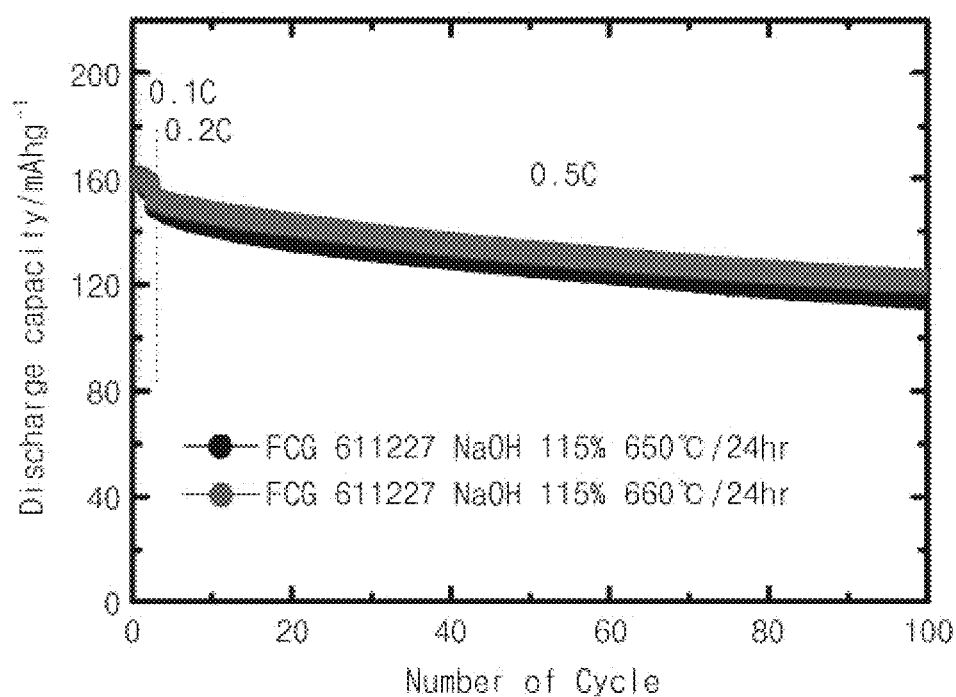

[Fig. 11]
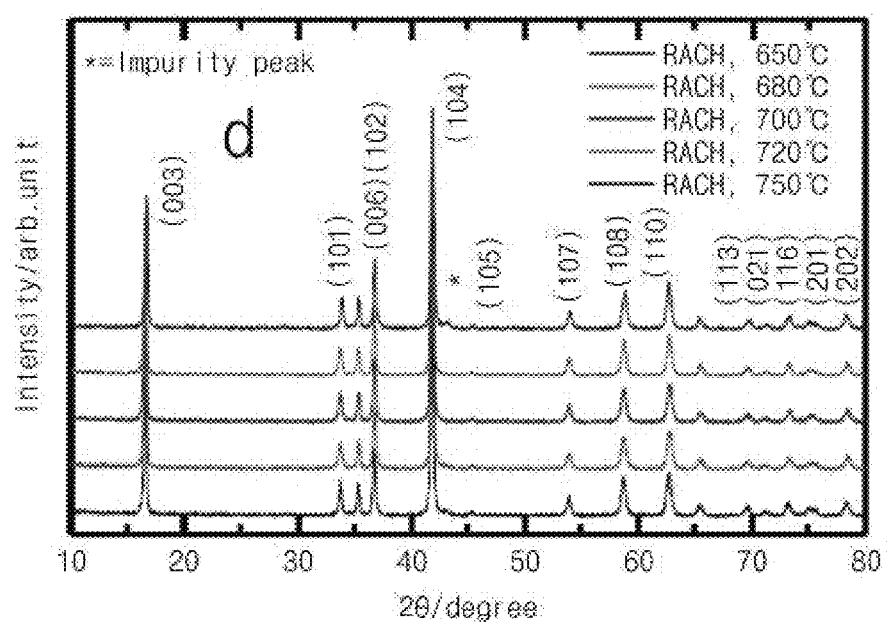

[Fig. 12]
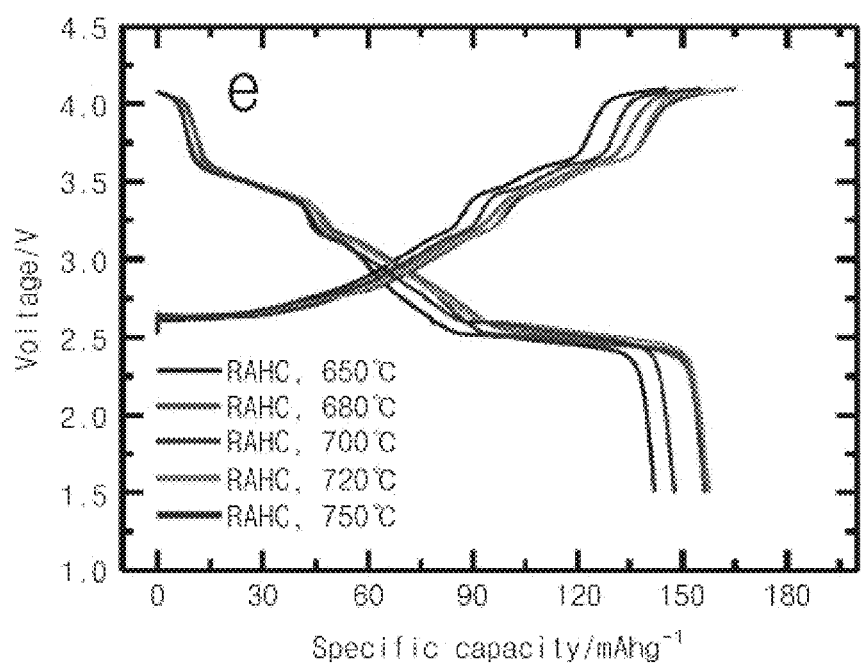

[Fig. 13]
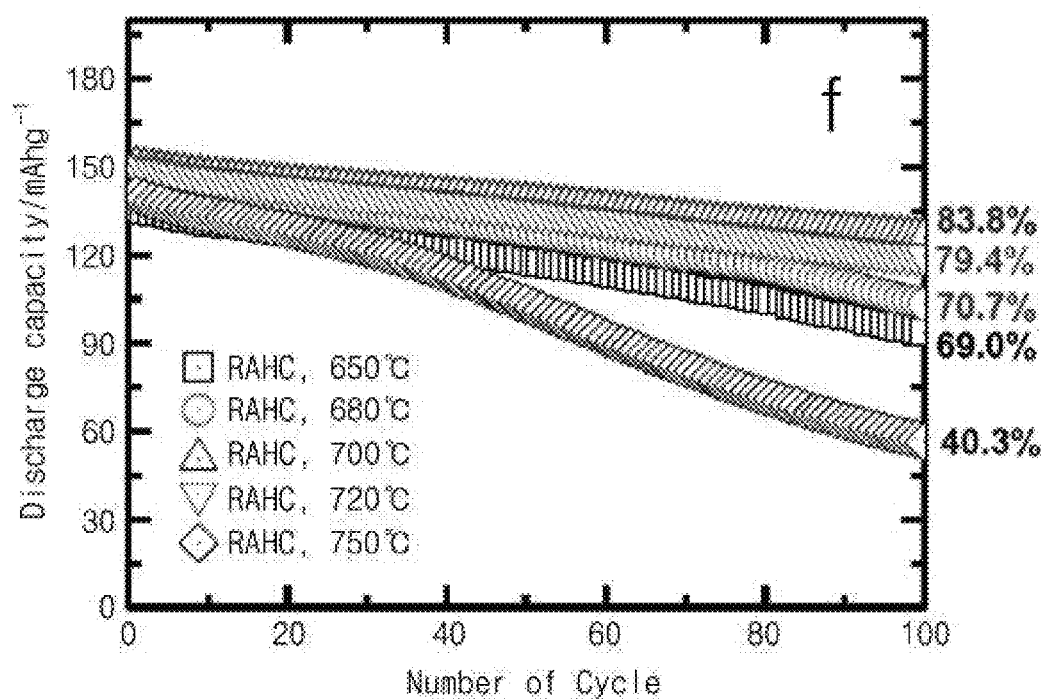

[Fig. 14]
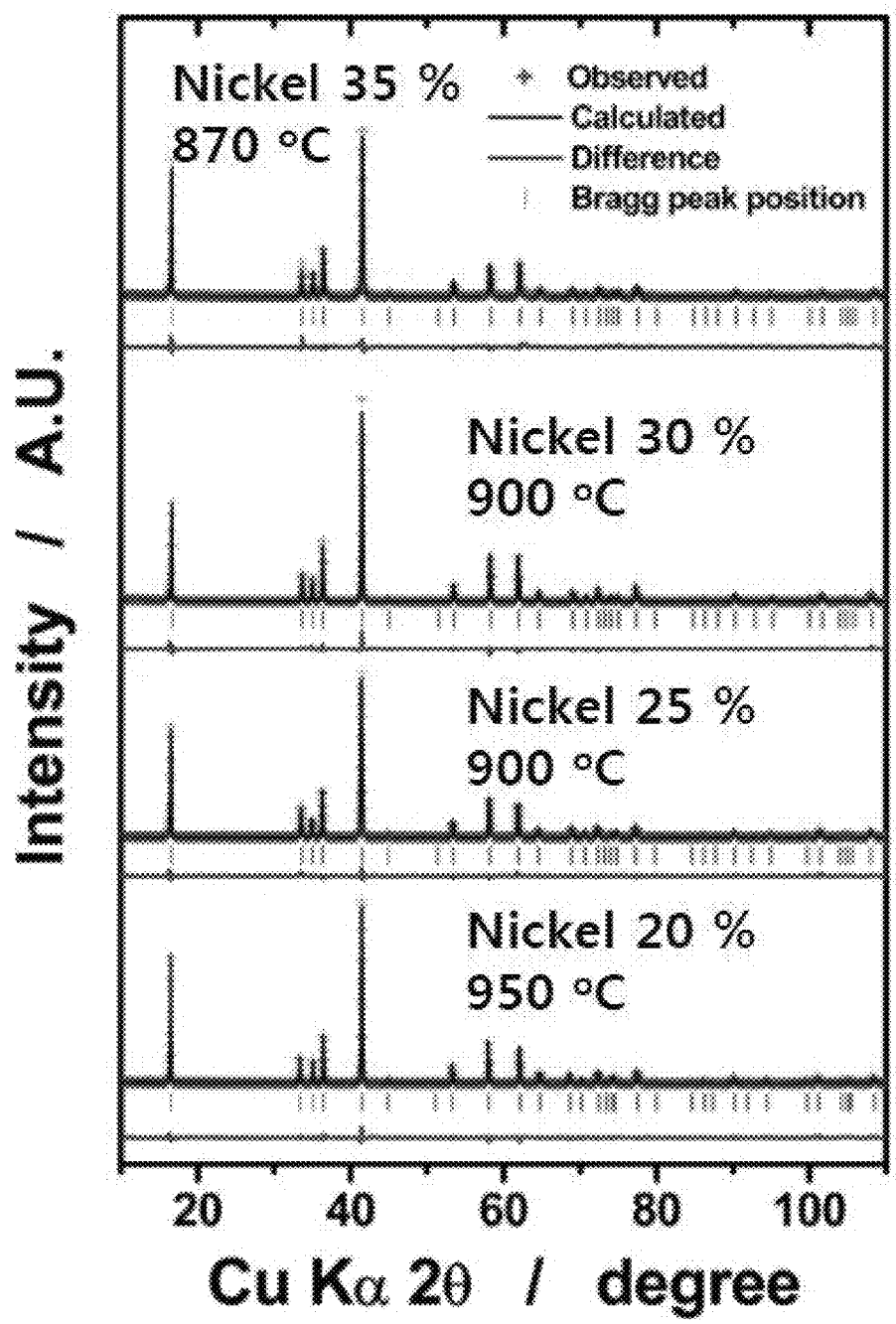

[Fig. 15]
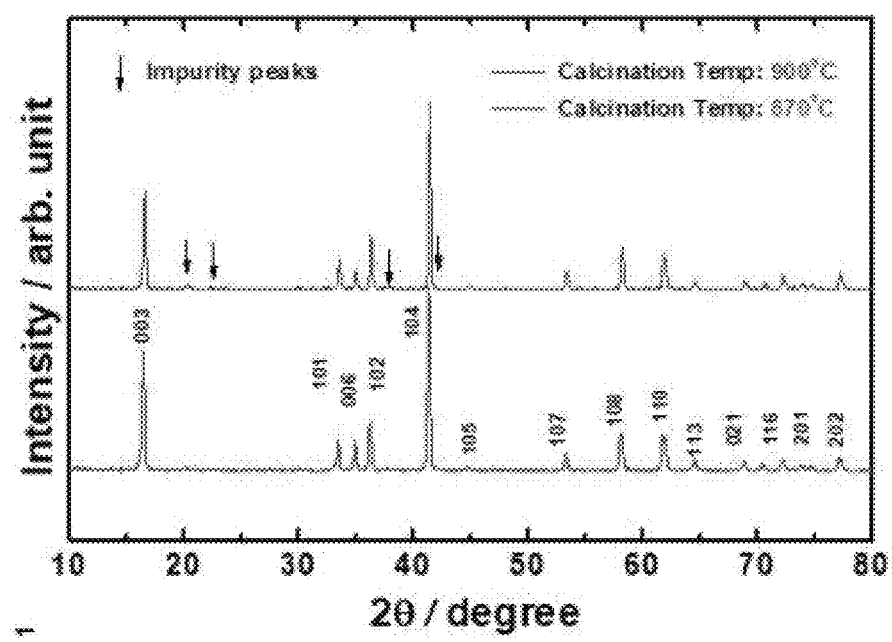

[Fig. 16]
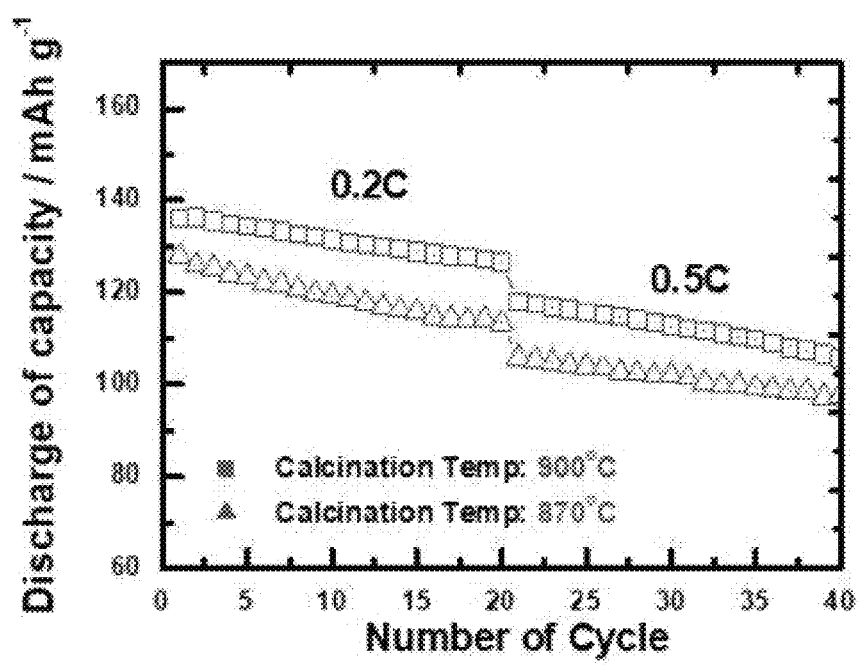

POSITIVE ACTIVE MATERIAL FOR RECHARGEABLE SODIUM BATTERY, AND METHOD OF FABRICATING THE SAME

CROSS-REFERENCE TO RELATED APPLICATION

This U.S. non-provisional patent application claims priority under 35 U.S.C. § 119 to Korean Patent Application No. 10-2016-0064684, filed on May 26, 2016, in the Korean Intellectual Property Office, the disclosure of which is hereby incorporated by reference in its entirety.

BACKGROUND

Embodiments of the inventive concepts relate to a positive active material for a rechargeable sodium battery and a method of fabricating the same. More particularly, embodiments of the inventive concepts relate to a positive active material for a rechargeable sodium battery and a method of fabricating the same, in which a kind of a sodium source is changed depending on a content of nickel or manganese included in a metal hydroxide precursor.

Rechargeable batteries capable of storing electrical energy have been increasingly demanded with the development of portable mobile electronic devices (e.g., smart phones, MP3 players, and tablet personal computers) and electric cars.

A lithium metal oxide may be used as a positive active material in a lithium ion rechargeable battery among the rechargeable batteries. In particular, $LiCoO_2$, $LiMn_2O_4$, or $LiNiO_2$ may be used as the lithium metal oxide. A cobalt-based lithium oxide among these materials has been commercialized and widely used. However, cobalt is expensive and harmful. A nickel-based lithium oxide is inexpensive and less harmful and realizes high capacity of a lithium ion rechargeable battery. However, powder synthesis of the nickel-based lithium oxide may not be easy and life characteristics of the nickel-based lithium oxide may be poor. A lithium composite oxide represented as $LiMM'O_x$ has been developed to solve these problems. Here, "M" and "M'" are transition metals such as Co, Mn, Ni, V, Fe, and/or W. In other words, a portion of Ni in $LiNiO_2$ is substituted with another metal to form the lithium composite oxide, and thus the synthesis of the lithium composite oxide may be easier and life characteristics of the lithium composite oxide may be improved. The improvement of these characteristics may be affected by a crystal structure or a particle shape of lithium oxide finally formed. For example, Korean Patent Publication No. 10-1999-0034749 (Application No. 10-1997-0056445, Applicant: Samsung SDI Co., Ltd.) discloses a lithium secondary battery that employs a lithium composite oxide ($LiNi_{(1-x-y)}Co_xM_yO_2$, where "M" is at least one metal atom selected from a group consisting of Al, Ca, Mg, and B, "x" ranges from 0.1 to 0.3, and "y" ranges from 0 to 0.1) to realize excellent capacity, excellent reversibility, and stable periodic life thereof. Here, the lithium composite oxide is used as a positive electrode material for the lithium secondary battery.

SUMMARY

Embodiments of the inventive concepts may provide a highly reliable positive active material for a rechargeable sodium battery, and a method of fabricating the same.

Embodiments of the inventive concepts may also provide a positive active material for a rechargeable sodium battery having excellent charge/discharge characteristics, and a method of fabricating the same.

Embodiments of the inventive concepts may further provide a long-life positive active material for a rechargeable sodium battery, and a method of fabricating the same.

In an aspect, a method of fabricating a positive active material for a rechargeable sodium battery may include forming a metal hydroxide precursor including nickel, cobalt, and manganese, and fabricating a positive active material by mixing and firing the metal hydroxide precursor and a sodium source. A kind of the sodium source may be changed depending on a content of nickel or manganese included in the metal hydroxide precursor.

In some embodiments, the fabricating of the positive active material may include quenching the metal hydroxide precursor and the sodium source after the mixing and firing of the metal hydroxide precursor and the sodium source.

In some embodiments, the positive active material may be quenched in a vacuum state.

In some embodiments, the fabricating of the positive active material may include melting the sodium source before the mixing of the sodium source and the metal hydroxide precursor.

In some embodiments, the metal hydroxide precursor and the sodium source may be fired at a temperature of 680 degrees Celsius to 720 degrees Celsius.

In some embodiments, the forming of the metal hydroxide precursor may include preparing nickel sulfate, cobalt sulfate, and manganese sulfate, forming a core portion, in which concentrations of nickel, cobalt and manganese are constant, by using the nickel sulfate, the cobalt sulfate, and the manganese sulfate, and forming a concentration gradient portion, in which a concentration of at least one of nickel, cobalt or manganese is varied, by adjusting a ratio of the nickel sulfate, the cobalt sulfate and the manganese sulfate. The concentration gradient portion may surround the core portion.

In some embodiments, the forming of the metal hydroxide precursor may further include forming a shell portion, in which concentrations of nickel, cobalt and manganese are constant, by using the nickel sulfate, the cobalt sulfate, and the manganese sulfate.

In some embodiments, the sodium source may include at least one of NaOH or $Na_2CO_3$.

In some embodiments, the sodium source may include NaOH when the content of nickel in the metal hydroxide precursor is relatively high, and the sodium source may include $Na_2CO_3$ when the content of nickel in the metal hydroxide precursor is relatively low.

BRIEF DESCRIPTION OF THE DRAWINGS

The application file contains at least one drawing executed in color. Copies of this application publication with the color drawings will be provided by the Office upon request and payment of the necessary fee.

FIG. 1 is a flowchart illustrating a method of fabricating a positive active material for a rechargeable sodium battery, according to some embodiments of the inventive concepts.

FIGS. 2 and 3 are schematic views illustrating positive active materials for a rechargeable sodium battery, according to some embodiments of the inventive concepts.

FIG. 4 is a graph illustrating a process of fabricating a positive active material for a rechargeable sodium battery, according to some embodiments of the inventive concepts.

FIG. 5 is a schematic view illustrating a rechargeable sodium battery according to some embodiments of the inventive concepts.

FIG. 6 is a graph illustrating results of X-ray diffraction (XRD) measurement of positive active materials for a rechargeable sodium battery, fabricated according to first and second embodiments of the inventive concepts.

FIG. 7 is a graph illustrating evaluation results of charge/discharge characteristics of a rechargeable sodium battery including a positive active material fabricated according to a third embodiment of the inventive concepts.

FIG. 8 is a graph illustrating evaluation results of capacity retention characteristics of the rechargeable sodium battery including the positive active material fabricated according to the third embodiment of the inventive concepts.

FIG. 9 is a graph illustrating evaluation results of charge/discharge characteristics of rechargeable sodium batteries including positive active materials fabricated according to fifth and sixth embodiments of the inventive concepts.

FIG. 10 is a graph illustrating evaluation results of capacity retention characteristics of rechargeable sodium batteries including positive active materials fabricated according to fourth and fifth embodiments of the inventive concepts.

FIG. 11 is a graph illustrating results of XRD measurement of rechargeable sodium batteries including positive active materials fabricated according to seventh to eleventh embodiments of the inventive concepts.

FIG. 12 is a graph illustrating evaluation results of charge/discharge characteristics of rechargeable sodium batteries including positive active materials fabricated according to embodiments of the inventive concepts.

FIG. 13 is a graph illustrating evaluation results of capacity retention characteristics of rechargeable sodium batteries including positive active materials fabricated according to embodiments of the inventive concepts.

FIG. 14 is a graph illustrating results of XRD measurement of rechargeable sodium batteries including positive active materials fabricated according to twelfth to fifteenth embodiments of the inventive concepts.

FIG. 15 is a graph illustrating results of XRD measurement of positive active materials for a rechargeable sodium battery, fabricated according to thirteenth and sixteenth embodiments of the inventive concepts.

FIG. 16 is a graph illustrating charge/discharge characteristics of rechargeable sodium batteries including the positive active materials fabricated according to the thirteenth and sixteenth embodiments of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

FIG. 1 is a flowchart illustrating a method of fabricating a positive active material for a rechargeable sodium battery, according to some embodiments of the inventive concepts, and FIGS. 2 and 3 are schematic views illustrating positive active materials for a rechargeable sodium battery, according to some embodiments of the inventive concepts. FIG. 4 is a graph illustrating a process of fabricating a positive active material for a rechargeable sodium battery, according to some embodiments of the inventive concepts.

Referring to FIGS. 1 to 4, a metal hydroxide precursor including nickel, cobalt, and manganese may be formed (S110). In some embodiments, the metal hydroxide precursor may be formed by a co-precipitation method. In detail, the formation of the metal hydroxide precursor may include preparing nickel sulfate, cobalt sulfate, and manganese sulfate, and forming the metal hydroxide precursor by a co-precipitation method using the nickel sulfate, the cobalt sulfate, and the manganese sulfate.

For example, a metal aqueous solution in which the nickel sulfate, the cobalt sulfate, and the manganese sulfate are mixed at a concentration of 2.5M may be formed. The metal aqueous solution may be provided into a co-precipitation reactor having a capacity of 16 L and an output of 80 W or more, and then, the metal aqueous solution may be stirred at 400 rpm under a temperature condition of 45 degrees Celsius while supplying a $N_2$ gas at a rate of 2 liters/min, thereby forming the metal hydroxide precursor. In this case, sodium hydroxide of 5 mol may be supplied into the co-precipitation reactor, thereby adjusting a pH of the metal aqueous solution to 11.5. The metal hydroxide precursor in the co-precipitation reactor may be filtered and cleaned and may then be dried at 110 degrees Celsius for 12 hours. In some embodiments, as illustrated in FIG. 2, the metal hydroxide precursor may include a core portion 110 in which concentrations of nickel, cobalt and manganese are constant, and a concentration gradient portion 120 in which a concentration of at least one of nickel, cobalt or manganese is varied. In this case, the formation of the metal hydroxide precursor may include forming the core portion 110 while uniformly maintaining the supply amounts of the nickel sulfate, the cobalt sulfate and the manganese sulfate, and forming the concentration gradient portion 120 while varying the supply amount of at least one of the nickel sulfate, the cobalt sulfate or the manganese sulfate.

In other embodiments, as illustrated in FIGS. 2 and 3, the metal hydroxide precursor may include the core portion 110 and the concentration gradient portion 120 and may further include a shell portion 130 in which concentrations of nickel, cobalt and manganese are constant. In this case, the formation of the metal hydroxide precursor may further include forming the shell portion 130 while uniformly maintaining the supply amounts of the nickel sulfate, the cobalt sulfate and the manganese sulfate after the formation of the core portion 110 and the concentration gradient portion 120.

A positive active material may be fabricated by mixing and firing the metal hydroxide precursor and a sodium source (S120). The sodium source may be melted before the sodium source is mixed with the metal hydroxide precursor, as illustrated in FIG. 4. For example, when the sodium source is NaOH, the sodium source may be thermally treated at 320 degrees Celsius for 4 hours so as to be melted. In other embodiments, when the sodium source is $Na_2CO_3$, the sodium source may be thermally treated at 870 degrees Celsius for 4 hours so as to be melted. NaOH may be sensitive to moisture, and a loss of NaOH may be generated in a firing process. Thus, when NaOH is used as the sodium source, excess sodium source may be provided and may be fired together with the metal hydroxide precursor.

As illustrated in FIG. 4, the melted sodium source may be mixed with the metal hydroxide precursor, and then, the mixture of the melted sodium source and the metal hydroxide precursor may be fired. In some embodiments, the melted sodium source and the metal hydroxide precursor may be fired at a temperature of 680 degrees Celsius to 720 degrees Celsius.

The firing temperature may be adjusted according to a content of nickel and/or manganese included in the metal hydroxide precursor, and an impurity content of the fabricated positive active material may be controlled according to the firing temperature. In more detail, when a nickel content is low in the metal hydroxide precursor (or a manganese content is high), the impurity content may be lowered by performing the firing process at a relatively high firing temperature. On the other hand, when the nickel content is high in the metal hydroxide precursor (or the manganese content is low), the impurity content may be lowered by performing the firing process at a relatively low firing temperature.

Under the condition that the nickel content is relatively high in the metal hydroxide precursor, the metal hydroxide precursor and the sodium source may be effectively fired to easily fabricate the positive active material when the firing temperature of the metal hydroxide precursor and the sodium source is relatively low. Thus, when the nickel content is relatively high in the metal hydroxide precursor, the sodium source may include NaOH which can be melted at a relatively low temperature.

Under the condition that the nickel content is relatively low in the metal hydroxide precursor or the manganese content is relatively high in the metal hydroxide precursor, the metal hydroxide precursor and the sodium source may be effectively fired to easily fabricate the positive active material when the firing temperature of the metal hydroxide precursor and the sodium source is relatively high. Thus, when the nickel content is relatively low in the metal hydroxide precursor or the manganese content is relatively high in the metal hydroxide precursor, the sodium source may include $Na_2CO_3$ which can be melted at a relatively high temperature.

On the contrary, if NaOH melted at a relatively low temperature is used as the sodium source under the condition that the nickel content is relatively low in the metal hydroxide precursor or the manganese content is relatively high in the metal hydroxide precursor, adjustment of a molar ratio of the metal hydroxide precursor and NaOH highly reactive with air may not be easy by a high firing temperature. Thus, the positive active material may not be easily fabricated.

As described above, a kind of the sodium source may be changed depending on the content of nickel or manganese included in the metal hydroxide precursor. Thus, the metal hydroxide precursor and the sodium source may be effectively fired.

If the kind of the sodium source is not changed depending on the content of nickel or manganese included in the metal hydroxide precursor, the sodium source and the metal hydroxide precursor may not be easily fired, and thus electrical and chemical characteristics of the positive active material may be deteriorated.

However, according to embodiments of the inventive concepts, the sodium source having a melting point corresponding to the content of nickel or manganese included in the metal hydroxide precursor may be used to fabricate the positive active material. Thus, the electrical and chemical characteristics of the positive active material may be improved.

The fabrication of the positive active material may further include quenching the positive active material after the mixing and firing of the metal hydroxide precursor and the sodium source, as illustrated in FIG. 4. In more detail, the positive active material may be quenched in a vacuum state. In addition, the metal hydroxide precursor and the sodium source may be quenched directly after they are fired. Thus, it is possible to minimize or prevent deterioration of the characteristics of the positive active material including a sodium compound.

If the quenching process is not performed and the positive active material is exposed to the atmosphere including moisture, a structure of the positive active material may be broken by sodium having the high reactivity with moisture, and thus the characteristics of the positive active material may be deteriorated.

However, according to the aforementioned embodiments of the inventive concepts, the quenching process may be performed directly after the metal hydroxide precursor and the sodium source are fired. Thus, reaction between the moisture in the atmosphere and the sodium compound in the positive active material may be minimized or prevented to realize the positive active material having a long-life characteristic, high reliability, and high stability.

For example, the quenching of the positive active material may include rapidly lowering a temperature of the metal hydroxide precursor and the sodium source to a room temperature in a reduction furnace for a time of about 2 hours to about 3 hours while maintaining a vacuum state, directly after the metal hydroxide precursor and the sodium source are fired.

A rechargeable sodium battery including the positive active material fabricated according to the aforementioned embodiments will be described hereinafter.

FIG. 5 is a schematic view illustrating a rechargeable sodium battery according to some embodiments of the inventive concepts.

Referring to FIG. 5, a rechargeable sodium battery may include a negative electrode 200, a positive electrode 300 including a positive active material, a separator 400, and an electrolyte 500.

The positive electrode 300 may include the positive active material for a rechargeable sodium battery, described with reference to FIGS. 1 to 4. For example, the positive active material for the rechargeable sodium battery, a super-P used as a conductive material, and a polyvinylidene fluoride (PVdF) binder may be mixed with each other at a weight ratio of 85:7.5:7.5 to form slurry for forming an electrode, and the slurry may be uniformly applied to aluminum foil having a thickness of 20 μm. The aluminum foil to which the slurry is applied may be dried at 120 degrees Celsius in a vacuum, thereby fabricating the positive electrode 300.

The negative electrode 200 may include at least one selected from a group consisting of graphite, an alloy, an organic material, and a phosphorus (P)-based material.

The separator 400 may be disposed between the negative electrode 200 and the positive electrode 300. The separator 400 may include at least one selected from a group consisting of microporous layers formed of polyolefine-based resin, fluorine-based resin, polyester-based resin, polyacrylonitrile resin, and a cellulose-based material or may include the selected microporous layer coated with an organic material (e.g., ceramic). For example, the polyolefine-based resin may include polyethylene or polypropylene, the fluorine-based resin may include polyvinylidene fluoride or polytetrafluoroethylene, and the polyester-based resin may include polyethylene terephthalate or polybutylene terephthalate.

The electrolyte 500 may be disposed between the negative electrode 200 and the positive electrode 300. In some embodiments, the electrolyte 500 may be impregnated in the separator 400, the positive electrode 300, or the negative electrode 200. The electrolyte 500 may be a gel polymer-type electrolyte or a liquid electrolyte.

For example, a co-solvent including dimethyl carbonate (DC) and/or ethylmethyl carbonate (EMC) may be added into a basic solvent including ethylene carbonate (EC) and/or propylene carbonate (PC), and a sodium salt may be dissolved in the basic solvent added with the co-solvent to form the electrolyte 500. The positive active material for the rechargeable sodium battery according to embodiments of the inventive concepts may be fabricated by mixing and firing the sodium source and the precursor including nickel, cobalt and manganese. Thus, it is possible to realize a highly reliable rechargeable sodium battery having excellent charge/discharge characteristics and a long-life characteristic.

Characteristics of experimental examples were evaluated through detailed experiments.

FIG. 6 is a graph illustrating results of X-ray diffraction (XRD) measurement of positive active materials for a rechargeable sodium battery, fabricated according to first and second embodiments of the inventive concepts.

Referring to FIG. 6, a metal hydroxide precursor including nickel, cobalt, and manganese was formed. In detail, the metal hydroxide precursor was formed to have a concentration gradient from a central portion toward a surface portion in an entire particle by a co-precipitation method using nickel sulfate, manganese sulfate, and cobalt sulfate. At this time, average contents of nickel, cobalt, and manganese in the metal hydroxide precursor were 61%, 12%, and 27%, respectively. The metal hydroxide precursor was mixed with NaOH used as a sodium source, and the mixtures were fired at different temperatures in accordance with first and second embodiments.

Fabrication of Positive Active Material According to First Embodiment

NaOH of 115% and the metal hydroxide precursor were fired at 720 degrees Celsius for 24 hours to fabricate a positive active material according to the first embodiment.

Fabrication of Positive Active Material According to Second Embodiment

NaOH of 115% and the metal hydroxide precursor were fired at 660 degrees Celsius for 24 hours to fabricate a positive active material according to the second embodiment.

XRD results of the positive active materials according to the first and second embodiments were measured as illustrated in FIG. 6. According to the measured results, intensities and positions of main peaks were the same as each other. As a result, it may be recognized that a difference between the firing temperatures does not affect a crystal structure of the positive active material.

FIG. 7 is a graph illustrating evaluation results of charge/discharge characteristics of a rechargeable sodium battery including a positive active material fabricated according to a third embodiment of the inventive concepts, and FIG. 8 is a graph illustrating evaluation results of capacity retention characteristics of the rechargeable sodium battery including the positive active material fabricated according to the third embodiment of the inventive concepts.

Fabrication of Positive Active Material According to Third Embodiment

Referring to FIG. 7, a metal hydroxide precursor according to the third embodiment was formed by the substantially same method as the metal hydroxide precursor of the first embodiment. However, the metal hydroxide precursor of the third embodiment included nickel, cobalt and manganese having concentration gradients in an entire particle, and average contents of nickel, cobalt and manganese were 60%, 5%, and 35%, respectively. NaOH and the metal hydroxide precursor were fired at 720 degrees Celsius for 24 hours to fabricate a positive active material according to the third embodiment.

A rechargeable sodium battery was fabricated to include the positive active material according to the third embodiment, and charge/discharge characteristics of the rechargeable sodium battery were measured under a cut-off condition of a range of 1.5V to 4.1V, as illustrated in FIG. 7. A discharge capacity of the positive active material was about 160 mAhg$^{-1}$.

Discharge capacity characteristics of the rechargeable sodium battery including the positive active material of the third embodiment were evaluated as illustrated in FIG. 8. The discharge capacity according to a cycle of the rechargeable sodium battery including the positive active material of the third embodiment was measured under a condition of 0.5 C. It may be recognized that initial charge/discharge capacity and efficiency are excellent and the rechargeable sodium battery has an excellent life characteristic at 100 cycles.

FIG. 9 is a graph illustrating evaluation results of charge/discharge characteristics of rechargeable sodium batteries including positive active materials fabricated according to fifth and sixth embodiments of the inventive concepts, and FIG. 10 is a graph illustrating evaluation results of capacity retention characteristics of rechargeable sodium batteries including positive active materials fabricated according to fourth and fifth embodiments of the inventive concepts.

Referring to FIGS. 9 and 10, positive active materials according to fourth to sixth embodiments were fabricated using the substantially same method as the metal hydroxide precursor of the first embodiment while changing contents of nickel, cobalt and manganese and a firing temperature.

Fabrication of Positive Active Material According to Fourth Embodiment

A metal hydroxide precursor of the fourth embodiment was formed by the substantially same method as the metal hydroxide precursor of the first embodiment, but average contents of nickel, cobalt and manganese were respectively 61%, 12% and 27% in the metal hydroxide precursor of the fourth embodiment. NaOH and the metal hydroxide precursor were fired at 650 degrees Celsius for 24 hours to fabricate the positive active material according to the fourth embodiment.

Fabrication of Positive Active Material According to Fifth Embodiment

A metal hydroxide precursor of the fifth embodiment was formed by the substantially same method as the metal hydroxide precursor of the first embodiment, but average contents of nickel, cobalt and manganese were respectively 61%, 12% and 27% in the metal hydroxide precursor of the fifth embodiment. NaOH and the metal hydroxide precursor were fired at 660 degrees Celsius for 24 hours to fabricate the positive active material according to the fifth embodiment.

Fabrication of Positive Active Material According to Sixth Embodiment

A metal hydroxide precursor of the sixth embodiment was formed by the substantially same method as the metal hydroxide precursor of the first embodiment, but average contents of nickel, cobalt and manganese were respectively 61%, 12% and 27% in the metal hydroxide precursor of the sixth embodiment. NaOH and the metal hydroxide precursor were fired at 680 degrees Celsius for 24 hours to fabricate the positive active material according to the sixth embodiment.

As illustrated in FIG. 9, discharge capacities of the positive active materials according to the fifth and sixth embodiments are about 160 mAhg$^{-1}$.

As illustrated in FIG. 10, the discharge capacities according to a cycle of rechargeable sodium batteries including the positive active materials of the fourth and fifth embodiments were measured under a condition of 0.5 C, and it may be recognized that initial charge/discharge capacities and efficiency are excellent and the rechargeable sodium batteries have excellent life characteristics at 100 cycles.

FIG. 11 is a graph illustrating results of XRD measurement of rechargeable sodium batteries including positive active materials fabricated according to seventh to eleventh embodiments of the inventive concepts, and FIG. 12 is a graph illustrating evaluation results of charge/discharge characteristics of rechargeable sodium batteries including positive active materials fabricated according to embodiments of the inventive concepts. FIG. 13 is a graph illustrating evaluation results of capacity retention characteristics of rechargeable sodium batteries including positive active materials fabricated according to embodiments of the inventive concepts.

Referring to FIGS. 11 to 13, a metal hydroxide precursor having a nickel content of 60 mol % was formed by the substantially same method as the metal hydroxide precursor according to the first embodiment. The metal hydroxide precursor and NaOH used as a sodium source were fired while changing a firing temperature from 650 degrees Celsius to 750 degrees Celsius, thereby fabricating positive active materials according to seventh to eleventh embodiments, as shown in the following table 1.

TABLE 1

| Classification | Firing temperature |
|---|---|
| Seventh embodiment | 650° C. |
| Eighth embodiment | 680° C. |
| Ninth embodiment | 700° C. |
| Tenth embodiment | 720° C. |
| Eleventh embodiment | 750° C. |

XRD results of the positive active materials according to the above embodiments were measured as illustrated in FIG. 11. According to the measured results, intensities and positions of main peaks are the same as each other. As a result, it may be recognized that differences between the firing temperatures do not substantially affect crystal structures of the positive active materials.

In addition, when the nickel content is relatively high like the seventh to eleventh embodiments, an impurity peak occurs as the firing temperature increases. In other words, occurrence of impurities may be reduced by performing the firing process at a relatively low temperature when the nickel content is relatively high, and thus it is effective to use a sodium source (e.g., NaOH) having a low melting point.

Furthermore, as illustrated in FIGS. 12 and 13, discharge capacities according to the number of charge/discharge cycles in the eighth to tenth embodiments in which the firing temperatures of the metal hydroxide precursor and NaOH (sodium source) ranged from 680 degrees Celsius to 720 degrees Celsius were higher than discharge capacities according to the number of charge/discharge cycles in the seventh and eleventh embodiments in which the firing temperatures of the metal hydroxide precursor and NaOH (sodium source) were 650 degrees Celsius and 750 degrees Celsius. Thus, by adjusting the firing temperature of the metal hydroxide precursor and the sodium source in the range of 680 degrees Celsius to 720 degrees Celsius, the crystal structure of the positive active material is not substantially affected and the charge/discharge characteristics of the rechargeable sodium battery is improved.

FIG. 14 is a graph illustrating results of XRD measurement of rechargeable sodium batteries including positive active materials fabricated according to twelfth to fifteenth embodiments of the inventive concepts, and FIG. 15 is a graph illustrating results of XRD measurement of positive active materials for a rechargeable sodium battery, fabricated according to thirteenth and sixteenth embodiments of the inventive concepts. FIG. 16 is a graph illustrating charge/discharge characteristics of rechargeable sodium batteries including the positive active materials fabricated according to the thirteenth and sixteenth embodiments of the inventive concepts.

Referring to FIGS. 14 to 16, metal hydroxide precursors having nickel contents ranging from 20 mol % to 35 mol % were formed by the substantially same method as the metal hydroxide precursor according to the first embodiment. The metal hydroxide precursors and Na$_2$CO$_3$ used as a sodium source were fired while changing a firing temperature from 870 degrees Celsius to 950 degrees Celsius, thereby fabricating positive active materials according to twelfth to sixteenth embodiments, as shown in the following table 2.

TABLE 2

| Classification | Nickel content | Firing temperature |
| --- | --- | --- |
| Twelfth embodiment | 35 mol % | 870° C. |
| Thirteenth embodiment | 30 mol % | 900° C. |
| Fourteenth embodiment | 25 mol % | 900° C. |
| Fifteenth embodiment | 20 mol % | 950° C. |
| Sixteenth embodiment | 30 mol % | 870° C. |

As shown in FIG. 14, impurities are not generated in the twelfth to fifteenth embodiments in which the nickel contents are relatively low as compared with the embodiments of FIG. 11 even though the firing temperatures are relatively high. Thus, when the nickel content is relatively low, it is effective to perform the firing process using the sodium source (e.g., $Na_2CO_3$) having a relatively high melting point.

In addition, as shown in FIGS. 15 and 16, when the nickel content is relatively low, an impurity peak occurs as the firing temperature decreases. Furthermore, charge/discharge characteristics in the case in which the firing process is performed at a low firing temperature (e.g., 870 degrees Celsius) under the condition of the relatively low nickel content are deteriorated by the impurities generated in the positive active material, as compared with charge/discharge characteristics in the case in which the firing process is performed at a high firing temperature (e.g., 900 degrees Celsius) under the condition of the relatively low nickel content.

As a result, an impurity content of the positive active material for a rechargeable sodium battery can be controlled when the firing temperature is controlled according to the nickel content in a positive active material precursor (e.g., the metal hydroxide precursor). In addition, the high-efficiency and long-life positive active material for a rechargeable sodium battery can be effectively fabricated by controlling the kind of the sodium source, which is mixed with and is fired together with the positive active material precursor (e.g., the metal hydroxide precursor), on the basis of the nickel content in the positive active material precursor (e.g., the metal hydroxide precursor).

According to some embodiments of the inventive concepts, the method of fabricating the positive active material for the rechargeable sodium battery may include forming the metal hydroxide precursor including nickel, cobalt, and manganese, and fabricating the positive active material by mixing and firing the metal hydroxide precursor and the sodium source. The kind of the sodium source may be changed depending on the content of nickel or manganese included in the metal hydroxide precursor. Thus, according to embodiments of the inventive concepts, the sodium source having the melting point corresponding to the content of nickel or manganese included in the metal hydroxide precursor may be used to fabricate the positive active material. As a result, the metal hydroxide precursor and the sodium source may be effectively fired to fabricate the positive active material of which the electrical and chemical characteristics are improved.

In addition, the metal hydroxide precursor and the sodium source may be quenched after they are mixed and fired. Thus, characteristic deterioration of the positive active material by reaction with moisture may be minimized or prevented even though the positive active material including the sodium compound is exposed to the atmosphere. As a result, the reaction between the moisture in the atmosphere and the sodium compound in the positive active material may be minimized or prevented to realize the positive active material having a long-life characteristic, high reliability, and high stability.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method of fabricating a positive active material for a rechargeable sodium battery, the method comprising:
    forming a metal hydroxide precursor including nickel, cobalt, and manganese; and
    fabricating a positive active material by mixing and firing the metal hydroxide precursor and a sodium source,
    wherein the sodium source is selected from a first sodium source having a first melting point or a second sodium source having a second melting point which is lower than the first melting point,
    wherein a content of nickel included in the metal hydroxide precursor is selected from a first nickel content or a second nickel content which is higher than the first nickel content, and
    wherein when the first nickel content is selected, the first sodium source is selected in the method, and when the second nickel content is selected, the second sodium source is selected in the method.

2. The method of claim 1, wherein the fabricating of the positive active material comprises:
    quenching the metal hydroxide precursor and the sodium source after the mixing and firing of the metal hydroxide precursor and the sodium source.

3. The method of claim 1, wherein the positive active material is quenched in a vacuum state.

4. The method of claim 1, wherein the fabricating of the positive active material comprises:
    melting the sodium source before the mixing of the sodium source and the metal hydroxide precursor.

5. The method of claim 1, wherein the metal hydroxide precursor and the sodium source are fired at a temperature of 680 degrees Celsius to 720 degrees Celsius.

6. The method of claim 1, wherein the forming of the metal hydroxide precursor comprises:
    preparing nickel sulfate, cobalt sulfate, and manganese sulfate;
    forming a core portion, in which concentrations of nickel, cobalt and manganese are constant, by using the nickel sulfate, the cobalt sulfate, and the manganese sulfate; and
    forming a concentration gradient portion, in which a concentration of at least one of nickel, cobalt or manganese is varied, by adjusting a mole percent ratio of the nickel sulfate, the cobalt sulfate and the manganese sulfate,
    wherein the concentration gradient portion surrounds the core portion.

7. The method of claim 6, wherein the forming of the metal hydroxide precursor further comprises:
    forming a shell portion, in which concentrations of nickel, cobalt and manganese are constant, by using the nickel sulfate, the cobalt sulfate, and the manganese sulfate, wherein the shell portion surrounds the concentration gradient portion.

8. The method of claim 1, wherein the second sodium source includes NaOH, and the first sodium source includes $Na_2CO_3$.

* * * * *